Jan. 31, 1956

E. A. GERBER 2,733,405

CIRCUIT FOR MEASURING THE PARAMETERS
OF PIEZOELECTRIC CRYSTALS

Filed Nov. 27, 1951

*INVENTOR.*
EDUARD A. GERBER

BY

Harry M. Saragovitz
*Attorney*

Jan. 31, 1956
E. A. GERBER
2,733,405
CIRCUIT FOR MEASURING THE PARAMETERS
OF PIEZOELECTRIC CRYSTALS
Filed Nov. 27, 1951
2 Sheets-Sheet 2
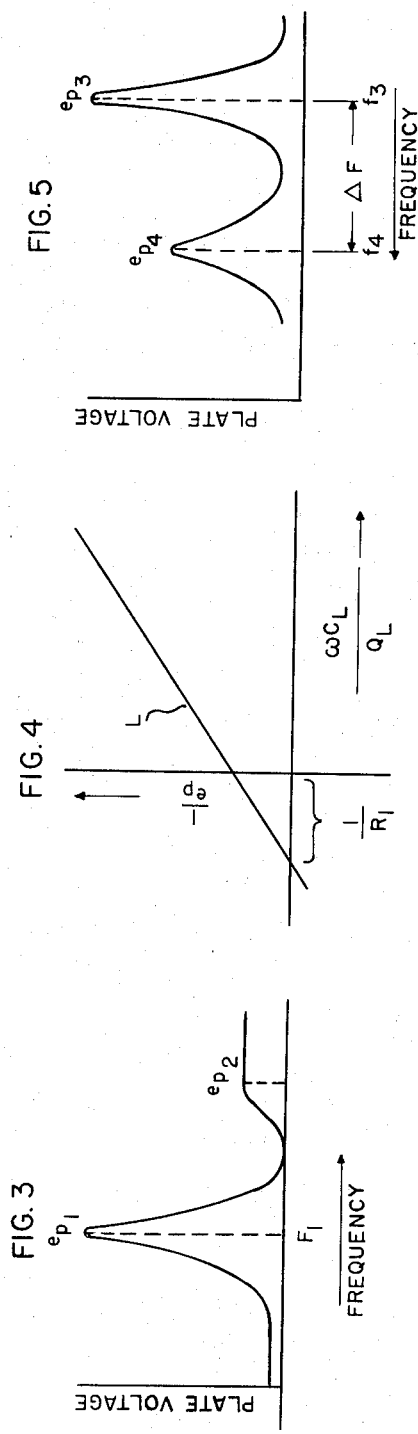
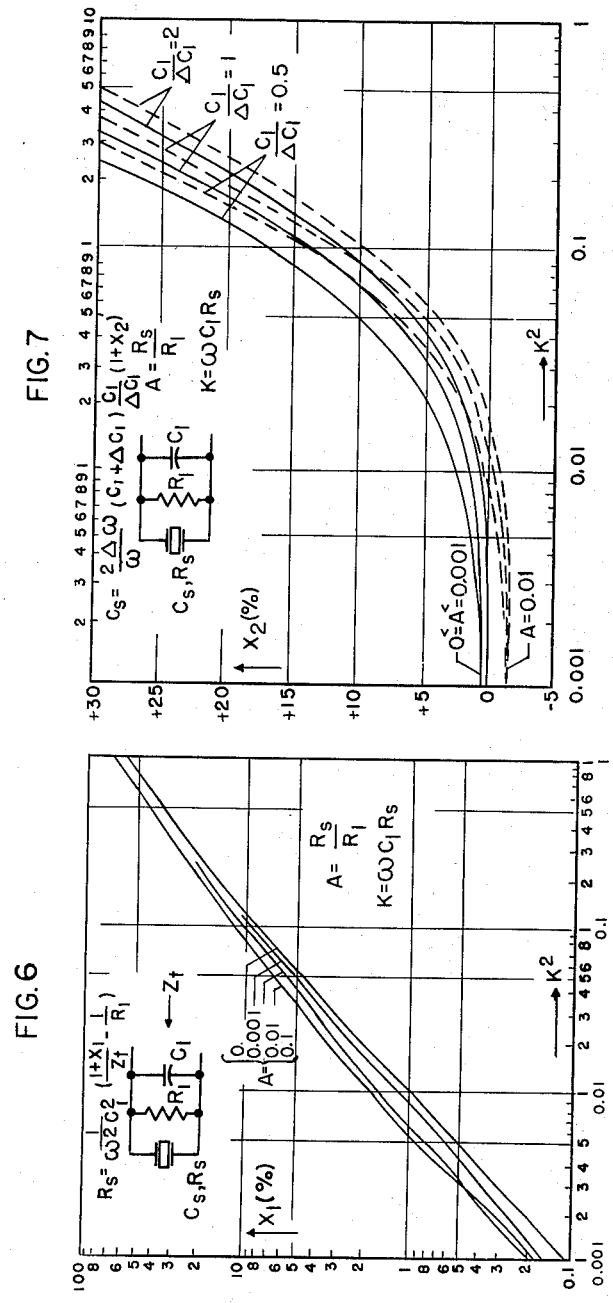
INVENTOR.
EDUARD A. GERBER
BY
Harry M. Saragovitz
Attorney

United States Patent Office 2,733,405
Patented Jan. 31, 1956

2,733,405
CIRCUIT FOR MEASURING THE PARAMETERS OF PIEZOELECTRIC CRYSTALS

Eduard A. Gerber, Elberon, N. J., assignor to the United States of America as represented by the Secretary of the Army Application November 27, 1951, Serial No. 258,498

6 Claims. (Cl. 324—56)

(Granted under Title 35, U. S. Code (1952), sec. 266)

The invention described herein may be manufactured and used by or for the Government for governmental purposes, without the payment of any royalty thereon.

This invention relates to electrical measuring circuits and more particularly to an electrical circuit for measuring the parameters of piezoelectric crystals.

As is well known, the electrical behavior of a piezoelectric crystal may be described by its equivalent circuit consisting of the series connection of an inductance $L_s$, capacitance $C_s$, and resistance $R_s$, in parallel with the static capacitance $C_0$. This circuit corresponds to the main resonance frequency of the crystal. However, especially at very high frequencies, the frequency spectrum of a crystal is rather complicated. Besides the main resonant frequency response, it shows a multitude of other resonance frequencies or spurious responses which may be represented by similar networks, more or less coupled together, as well as the network representing the main response.

The most important task in producing crystals for efficient operation at very high frequencies is to eliminate or at least reduce the spurious responses. To be able to perform this task, measuring equipment is necessary which not only gives a survey of the crystal spectrum, but allows measurements to be taken of the equivalent parameters of the main and spurious responses at the same time.

It is the object of this invention therefore to provide a circuit means for quickly and accurately measuring the equivalent parameters.

It is a further object of this invention to provide an antiresonant circuit for determining the series resistance $R_s$, and the series capacitance $C_s$, of a piezoelectric crystal.

A still further object of the invention is to measure the series resistance, $R_s$ and the series capacitance $C_s$ of the main and spurious responses of a piezoelectric crystal by analyzing the frequency spectrum.

In accordance with the present invention there is provided a high frequency sweep generator, the output of which is applied to an antiresonant arrangement comprising an amplifier having the crystal to be tested in the plate-cathode circuit thereof, rectifier means for rectifying the antiresonant responses, a filter network, and means for recording and measuring the rectified antiresonant voltages corresponding to both the main and spurious responses of the crystal. The series resistance of the crystal, $R_s$, is obtained by comparing the crystal antiresonant voltage peak with the voltage recorded across a pure capacitive load which is also connected in the plate-cathode circuit of the amplifier. The series capacitance of the crystal, $C_s$, is measured by recording the antiresonant frequency curve with the crystal unit in the plate-cathode circuit of the amplifier and then recording a second antiresonant frequency curve after the capacitance across the crystal unit has been increased by a predetermined amount. The frequency difference between the two antiresonant voltages gives a measure for $C_s$.

For a better understanding of the invention, together with other and further objects thereof, reference is had to the following description taken in connection with the accompanying drawing in which:

Figure 1 discloses the equivalent electrical network of a piezoelectric crystal;

Figures 3, 4 and 5 are explanatory curves; and

Figures 6 and 7 illustrate graphs for determining correction functions.

Figure 1:
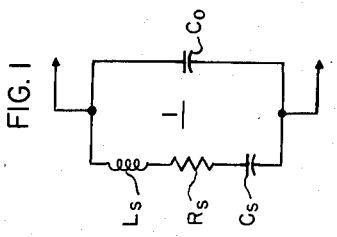

Referring now to Figure 1 of the drawings, there is shown a network 1 which represents the equivalent electrical network of a piezoelectric crystal which corresponds to the main resonance frequency of the crystal. This is a conventional representation of the equivalent electrical parameters of a crystal which is well known in the art and requires no lengthy discussions. It should be noted that the network comprises a shunt capacitance $C_0$ connected in parallel with a series circuit comprising an inductance $L_s$, resistance $R_s$ and capacitance $C_s$.

Figure 2:
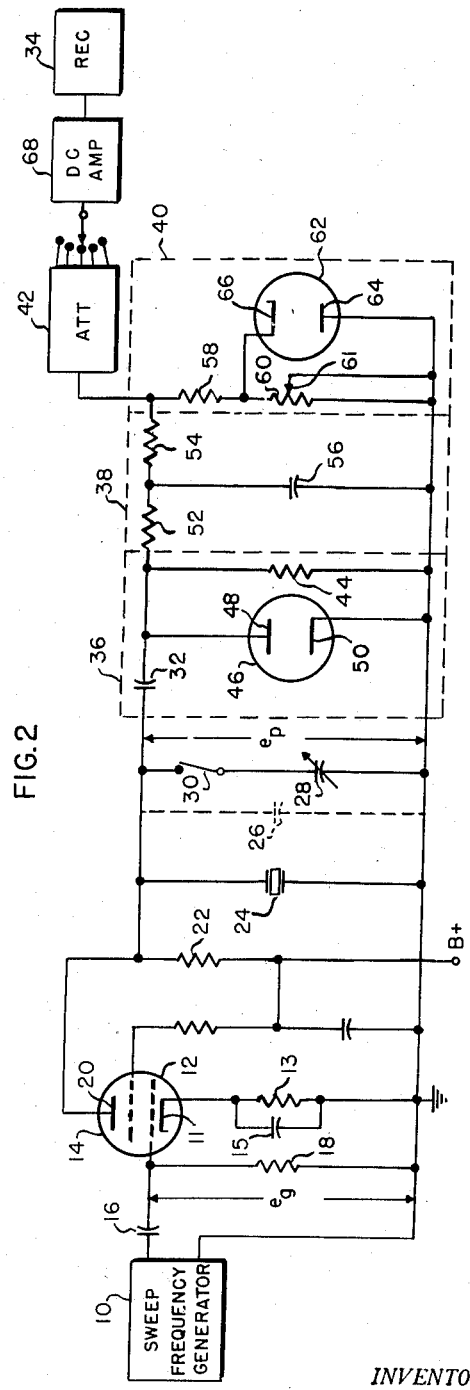
Figure 2 is a circuit showing all the essential electrical circuit features of the invention.

The circuit shown in Figure 2 shows the elementary principle of the invention and provides means for calculating or measuring the series resistance $R_s$ and the series capacitance $C_s$ of a crystal. At 10 there is shown an ultra-high frequency generator which is capable of providing a frequency sweep through a range of 20 kilocycles in a period of approximately 30 seconds. For example, if the frequency output of generator 10 is originally set for 30 megacycles, the frequency may be varied between 30 and 30.02 megacycles in a period of approximately 30 seconds. It is to be understood of course that other suitable slow sweep rates may be employed. The output of generator 10 is applied to input grid 12 of amplifier tube 14 by means of coupling capacitor 16 and grid resistor 18 which is connected between grid 12 and ground. Cathode 11 of tube 14 is connected to ground through cathode resistor 13. Cathode by-pass capacitor 15 is connected across resistor 13. Plate 20 of tube 14 is connected to B+ through plate load resistor 22. Connected in parallel arrangement between plate 20 and ground are the crystal 24, a variable capacitor 28 which may be connected to the plate circuit by switch 30 and the inherent plate circuit capacitance of the tube as represented by capacitor 26. The input voltage to grid 12 from generator 10 may be designated as $e_g$ and the plate voltage developed across the parallel plate circuit arrangement may be designated as $e_p$. Amplifier tube 14 may be of any suitable type having a relatively large transconductance, a high plate resistance, and a relatively small grid-plate capacitance. It is important to keep the latter as small as possible so as to minimize the Miller effect when measuring $e_g$. As hereinafter explained, the plate voltage $e_p$ is rectified and applied to a recorder unit 34.

In order to accurately measure the relative amplitudes of $e_p$ corresponding to the main and spurious responses of crystal 24, there is provided a rectifier circuit 36, a filter circuit 38, a residual current compensating circuit 40, and a conventional attenuator network 42. As shown, the radio-frequency voltage $e_p$ is coupled through capacitor 32 to rectifier circuit 36 which includes the parallel arrangement of resistor 44 and diode 46 connected between capacitor 32 and ground. Plate 48 of diode 46 is connected to capacitor 32 and cathode 50 of diode 46 is grounded.

The output of rectifier circuit 36 is applied to attenuator network 42 through series connected filter resistors 52 and 54. Connected between the junction of said resistors and ground is filter capacitor 56. Series connected resistor 58 and potentiometer 60 are connected between the input of attenuator network 42 and ground. Contact arm 61 of said potentiometer is grounded as shown. A compensating diode 62 is connected across potentiometer 60 with plate 64 of diode 62 connected to ground and cathode 66 of diode 62 being connected to the junction of resistor 58 and potentiometer 60. The output of attenuator 42 is applied to recorder unit 34 through a direct-current amplifier stage 68. By this arrangement attentuator 42 provides a constant-resistance network for changing the measuring range of the voltage applied to recorder unit 34 through direct-current amplifier 68. When the measuring range is changed, any residual current remaining in diode 46 is compensated by diode 62 so that there is no variation in the direct-current, or zero level, of the recorder unit. Filter network 38 isolates crystal 24 from amplifier stage 68 in order to minimize the influence of the input capacity thereof on the crystal.

In determining the series resistance $R_s$ of the crystal it is to be assumed that the plate-cathode resistance of tube 14 and the reactance of the inherent capacitance 26 are both larger than the crystal resistance $R_s$ at the main resonant frequency $$f_0 = \frac{\omega}{2\pi}$$

of the crystal, as is usually the case. The antiresonant impedance of the crystal is then approximately equal to the performance index which may be expressed by the following equation:

$$PI = \frac{1}{\omega^2 C_1^2 R_s} \quad (1)$$

where $\omega$ = resonant frequency of crystal multipled by $2\pi$
$C_1$ = includes all the capacitance of the plate circuit and the static capacity $C_0$
$R_s$ = series resistance of the crystal The method for obtaining the series resistance $R_s$ consists in comparing the antiresonant voltage $e_{p1}$ at a predetermined output frequency from signal generator 10 with that of a second plate voltage $e_{p2}$ developed across a pure capacitive load. The predetermined frequency may correspond to the main frequency response or any of the spurious frequency responses to be tested. It is to be assumed that switch 30 is open so that variable capacitor 28 is not included in the plate circuit for this case.

As shown in Figure 3, $e_{p1}$ may represent the antiresonant voltage developed across the crystal at a frequency $f_1$. It is to be understood that $e_{p1}$ may correspond to either the main frequency response or any of the spurious responses. $e_{p2}$ represents the voltage developed across a pure capacitive load. Because the reactance of a predetermined capacitor may be too low, plate voltage $e_{p2}$ may be developed by merely removing crystal 24 from its socket, thus utilizing the inherent capacitance of the tube, as represented by capacitor 26, as the pure capacitive load. With the crystal removed from its socket, the indication of $e_{p2}$ may remain constant within a narrow range of frequencies as shown in Figure 3.

It can be shown that $$\frac{e_{p1}}{e_{p2}} = \omega C_2 \left(\frac{1}{PI} + \frac{1}{R_1}\right)^{-1} \quad (2)$$

where $e_{p1}$ = antiresonant voltage developed across the crystal at a predetermined frequency
$e_{p2}$ = voltage developed across pure capacitive load
$C_2$ = inherent capacitance of the plate-cathode circuit
$PI$ = performance index or impedance of the crystal as defined in Equation 1
$R_1$ = plate-cathode circuit resistance of the amplifier tube
$\omega$ = operating frequency multiplied by $2\pi$ It is well known, that to obtain a pure capacitive load, the plate circuit resistance of tube 14, which includes plate load resistor 22, the dynamic plate resistance of said tube and the input resistance to diode 46, must be very much greater than the reactance of the inherent plate circuit capacitance $C_2$ of the tube 14. Thus, at very high frequencies $R_1$ may be so large as compared to the value of $PI$ that $R_1$ need not be calculated. Assuming this to be the case, it can be seen that by substituting the value of $PI$, as determined in Equation 1, in Equation 2, crystal resistance $R_s$ may be readily determined.

If the value of $R_1$ is such that it cannot be neglected, then its value may be determined by the following method: Crystal 24 is removed from the plate circuit of tube 14 and variable capacitor 28 is switched into the plate circuit of tube 14 by switch 30. Crystal 24 is respectively replaced by at least three discrete inductances. Each of the three inductances is individually connected in parallel with variable capacitor 28 thus replacing the crystal unit which, as mentioned above, has been removed from the plate circuit of said amplifier tube. Each of the inductances selected is such that, for one given frequency, at least three different readings on the dial of capacitor 28 corresponding to resonance may be obtained. Thus, each of the three inductances are separately and individually connected in parallel with variable capacitor 28 and three distinct readings of capacitor 28 are obtained for each inductance. The quality factor Q of each coil may readily be determined in the conventional manner by means of a bridge or a Q meter at the predetermined frequency $$f = \frac{\omega}{2\pi}$$

selected. The transconductance $g_m$ of the amplifier tube is known and $e_g$, the input voltage, may be measured by any of the suitable means well known in the art. The amplification of tube 14 in this case may be expressed by the following equation:

$$g_m \times \frac{e_g}{e_p} = \frac{\omega C_L}{Q_L} + \frac{1}{R_1} \quad (3)$$

where:

$\omega$ = operating frequency multiplied by $2\pi$
$g_m$ = transconductance of the amplifier tube
$e_g$ = input voltage to the amplifier tube at operating frequency
$C_L$ = capacitance which resonates with the coil at frequency $$\frac{\omega}{2\pi}$$

$Q_L$ = quality factor of inductance at frequency $$\frac{\omega}{2\pi}$$

$R_1$ = resistance of the plate circuit
By plotting $$\frac{\omega C_L}{Q_L}$$

for different values of $$\frac{C_L}{Q_L} \text{ against } \frac{1}{e_p}$$

($g_m$ and $e_g$ are constant values and need not be known) as shown n Figure 4, the value of $$\frac{1}{R_1}$$

may be easily determined. As shown, $$\frac{1}{R_1}$$

is the intercept of line L with the abscissa $$\frac{\omega C_L}{Q_L}$$

Of course, this measurement may be made at different frequencies to obtain values of $R_1$ over the operating frequency range for which the crystal may be tested. Thus $R_1$ may be determined within any given frequency range so that if it is desired to utilize this range of frequencies, the corresponding values of $R_1$ may readily be obtained. (This determination of $R_1$ has to be done only once.) Summing up, it may be stated that at very high frequencies, the value of $R_1$ need not be determined but at relative low frequencies the value of $R_1$ may be determined from Equation 3 and substituted in Equation 2 to calculate $R_s$.

Series capacitance $C_s$ may be determined as follows:

Crystal 24 is replaced in the plate circuit of amplifier tube 14 and variable capacitor 28 is removed from the plate circuit by opening switch 30. The output of frequency generator 10 is swept from high to low frequency. For example, if the crystal is designed to operate at 30 mc., then the output frequency generator 10 may be swept from 30.01 mc. to 29.99 mc. It is desirable to measure the series capacitance $C_s$ for a particular mode of operation such as $f_3$ shown in Figure 5. When the output of generator 10 passes the antiresonant peak of the mode selected as indicated on recorder unit 34, capacitor 28, having a predetermined capacitive value, is again switched into the plate circuit by closing switch 30 so that it is now in parallel arrangement with crystal 24. At this moment the antiresonant frequency of crystal 24 is decreased to $f_4$ because of the added parallel capacitance. Thus, as the sweep frequency decreases from the previous antiresonant frequency $f_3$, a new antiresonant frequency $f_4$ is approached and recorded. These first and second antiresonant voltages are shown in Figure 5 and are designated as $e_{p3}$ and $e_{p4}$ respectively. The frequency difference between said antiresonant peaks is designated by $$\Delta f = \frac{\Delta \omega}{2\pi}$$

For actually determining $\Delta f$, it is necessary to have a frequency calibration of the recorder. As is well known this may be accomplished by amplitude modulating signal generator 10 with a known audio frequency. The distance between one sideband and the main response furnishes a frequency mark which may be used for calibrating recorder unit 34. This frequency difference is a measure of the value of capacitance $C_s$ in accordance with the following expression:

$$C_s = \frac{2\Delta\omega}{\omega} \frac{C_1}{\Delta C_1}(C_1 + \Delta C_1) \quad (4)$$

where:

$\Delta\omega$ = Frequency difference $\times 2\pi$
$\omega$ = 1st resonant frequency $\times 2\pi$
$C_1$ = original capacitance in parallel with crystal
$\Delta C_1$ = capacitance added in parallel with crystal.

Since all the factors on the right side of Equation 4 are known, $C_s$ may readily be determined.

It is to be understood that for the validity of Equations 2 and 4, the same restrictions are in force as for Equation 1, namely, that if $R_1$ and $$\frac{1}{\omega_1 C_1} \gg R_s$$

does not hold true, more complicated expressions must replace Equations 2 and 4.

In order to make the above methods applicable to high frequencies where $$\frac{1}{\omega C_1}$$

is small, correction functions may be derived in accordance with the conformal representation method shown by C. W. Harrison in Bell Systems Technical Journal, volume 24, pp. 217–252, April 1945. The following expressions derived by means of conformal representation may be substituted respectively for Equations 2 and 4 where $$\frac{1}{\omega C_1}$$

is small.

$$\frac{e_{p1}}{e_{p2}} = \omega C_2 \left(\frac{1}{\omega^2 C_1^2 R_s} + \frac{1}{R_1}\right)(1+X_1) \quad (5)$$

$$C_s = 2\frac{\Delta\omega}{\omega} \frac{C_1}{C_1}(C_1+\Delta C_1)(1+X_2) \quad (6)$$

where $X_1$ and $X_2$ are correction functions.

Since $$\frac{1+X_1}{\omega^2 C_1^2 R_s} + \frac{1}{R_1}$$

is the absolute peak value of the total impedance $Z_T$, as measured, the value of $R_s$ may be determined from the following expression:

$$R_s = \frac{1}{\omega^2 C_1^2}\left(\frac{1+X_1}{Z_T} - \frac{1}{R_1}\right) \quad (7)$$

$R_1$ may be included in the correction function $X_1$, to give another correction function $X_3$ and the following expression may be written for Equation 7:

$$R_s = \frac{1}{\omega^2 C_1^2}\left(\frac{1+X_3}{Z_T}\right) \quad (8)$$

$X_1$, $X_2$ and $X_3$ may be represented as functions of the following relations:

$$K = R_s \omega C_1 \quad (9)$$

and $$A = \frac{R_s}{R_1} \quad (10)$$

In Figures 6 and 7, $X_1$ and $X_2$ are plotted as a function of $K^2$ for different values of $A$. In Figure 7, the curves are also plotted for three different values of $$\frac{C_1}{\Delta C_1}$$

Looking at Figure 6 it can be seen that the error in measuring $R_s$ is approximately 10% for a value of $K$ as large as $\sqrt{0.1}$. That means for instance that, in case a 100 mc. crystal with $C_1$ of 15 $\mu\mu$f. if $R_s$ is expected to be larger than 35 ohms.

While there have been described what at present are considered to be the preferred embodiment of the invention, it will be understood by those skilled in the art that various changes and modifications may be made herein without departing from the invention, and it is, therefore, aimed in the appended claim to cover all such modifications and changes as fall within the spirit and scope of the invention.

What is claimed is:

1. The method of determining the series resistance of a socket mounted piezoelectric crystal comprising, the steps of generating a voltage at a predetermined frequency corresponding to the main or spurious frequency mode of operation of said crystal, amplifying said generator voltage, applying said amplified generator voltage across said crystal in parallel arrangement with the amplifier output to develop an antiresonant voltage across the crystal at said predetermined frequency, rectifying and recording said antiresonant voltage, removing said crystal from its socket, rectifying and recording the voltage developed in the output circuit of said amplifier with the crystal removed from its socket, and deriving the series resistance of said crystal from said rectified and recorded voltages.

2. The method of determining the series resistance of a piezo-electric crystal comprising the steps of generating a voltage at a predetermined frequency corresponding to the main or spurious frequency mode of operation of said crystal, amplifying said generator voltage, applying said amplified generator voltage across said crystal in parallel arrangement with the amplifier output to develop an antiresonant voltage across the crystal at said predetermined frequency, rectifying and recording said antiresonant voltage, applying said amplifier generated voltage across a pure capacitive load, rectifying and recording the voltage generated across said pure capacitive load, and deriving the series resistance of said crystal from said rectified and recorded voltages.

3. The method of determining the series capacitance of a piezo-electric crystal comprising the steps of generating a voltage through a range of frequencies corresponding to the main and spurious modes of frequency operation of said crystal, amplifying said generator voltage, applying said amplified voltage across said crystal in parallel arrangement with the amplifier output to develop a peak voltage across said crystal at a first antiresonant frequency, rectifying and recording said first antiresonant frequency voltage, connecting a capacitive reactance in parallel arrangement with said crystal when the frequency output of said generator passes the peak of said first antiresonant voltage, applying said generator voltage across the parallel combination of said crystal and said capacitive reactance to develop a voltage across said crystal at a second antiresonant frequency, rectifying and recording the second antiresonant frequency voltage, and deriving the series capacitance of said crystal from the difference in frequency of said first and second antiresonant frequencies.

4. A method of determining the series resistance of a socket-mounted piezoelectric crystal comprising the steps of generating a voltage at a predetermined frequency corresponding to the main or spurious frequency mode of operation of said crystal, applying said generator voltage across said crystal in parallel arrangement with the generator output to develop an anti-resonant voltage across said crystal at said predetermined frequency, recording the magnitude of said anti-resonant voltage, removing the crystal from the generator output circuit, substituting for said crystal a pure capacitive load applying said generator voltage across said pure capacitive load, recording the magnitude of the voltage developed across said pure capacitive load, and deriving the series resistance of said crystal from said recorded voltages.

5. A method of determining the series capacitance of a piezoelectric crystal comprising the steps of generating a voltage through a range of frequencies corresponding to the main and spurious modes of frequency operation of said crystal, amplifying said generator voltage, applying said amplified voltage across said crystal in parallel arrangement with the output of the amplifier to develop a voltage across the crystal at a first anti-resonant frequency, recording said anti-resonant frequency, connecting a capacitive reactance in parallel arrangement with said crystal when the frequency output of said generator passes the anti-resonant peak of said first anti-resonant voltage, applying said generator voltage across the parallel combination of said crystal and said capacitive reactance to develop a voltage at a second anti-resonant frequency, recording said second anti-resonant frequency and deriving the series capacitance of said crystal from the difference in frequency of said first and second anti-resonant frequencies.

6. The method of determining the series capacitance of a piezoelectric crystal comprising the steps of generating a voltage through a range of frequencies corresponding to the main and spurious modes of frequency operation of said crystal, applying said generated voltage across a first parallel arrangement of the crystal and a first predetermined capacitive reactance to develop a peak voltage across said crystal at a first antiresonant frequency, rectifying and recording said first antiresonant frequency voltage, connecting a second capacitive reactance across said first parallel arrangement to form a second parallel arrangement at the instant the voltage output of said generator reaches said peak voltage, applying said generator voltage across the second parallel arrangement to develop a peak voltage at a second antiresonant frequency, rectifying and recording said second antiresonant frequency voltage, and deriving the series capacitance in accordance with the formula $$C_s = \frac{2\Delta\omega}{\omega} \frac{C_1}{\Delta C_1} (C_1 + \Delta C_1)$$

where $\Delta\omega$ = difference in frequency between said first and second antiresonant frequencies $\times 2\pi$
$\omega$ = first antiresonant frequency $\times 2\pi$
$C_1$ = capacitance in first parallel arrangement
$\Delta C_1$ = capacitance added to the first parallel arrangement.

References Cited in the file of this patent

UNITED STATES PATENTS

| | | |
|---|---|---|
| 2,137,787 | Snow | Nov. 22, 1938 |
| 2,400,895 | Wachtman | May 28, 1946 |
| 2,448,581 | Fair | Sept. 7, 1948 |
| 2,463,616 | Harrison | Mar. 8, 1949 |
| 2,476,954 | Blackburn | July 26, 1949 |
| 2,542,275 | Ekstein | Feb. 20, 1951 |